United States Patent [19]

Le Viet

[11] Patent Number: 4,778,969

[45] Date of Patent: * Oct. 18, 1988

[54] PROCESS AND DEVICE FOR HOMOGENEOUS MICROWAVE THERMAL TREATMENT OF LIQUID OR SOLUTION IN MOTION

[75] Inventor: Toai Le Viet, Vevey, Switzerland

[73] Assignee: Nestec S. A., Vevey, Switzerland

[*] Notice: The portion of the term of this patent subsequent to Sep. 15, 2004 has been disclaimed.

[21] Appl. No.: 19,650

[22] Filed: Feb. 27, 1987

Related U.S. Application Data

[63] Continuation of Ser. No. 846,291, Mar. 31, 1986, Pat. No. 4,694,133.

[30] Foreign Application Priority Data

May 6, 1985 [CH] Switzerland ............... 1906/85-5

[51] Int. Cl.$^4$ .................................... H05B 6/78
[52] U.S. Cl. ............... 219/10.55 M; 219/10.55 A
[58] Field of Search ............... 219/10.55 A, 10.55 M, 219/10.55 R, 10.55 F, 10.65, 299, 305, 306; 34/1; 138/38, 41; 165/177, 181, 109.1

[56] References Cited

U.S. PATENT DOCUMENTS

| | | | |
|---|---|---|---|
| 2,473,539 | 11/1944 | Merriam | 34/1 |
| 2,513,242 | 6/1950 | Inman | 219/10.51 |
| 2,585,970 | 6/1949 | Shaw | 219/10.65 X |
| 3,171,009 | 4/1961 | Scheller et al. | 219/10.55 R |
| 4,004,122 | 1/1977 | Hallier | 219/10.55 A |
| 4,089,176 | 5/1978 | Ashe | 219/10.51 X |
| 4,284,869 | 8/1981 | Pinkstaff | 219/10.55 A |
| 4,400,604 | 8/1983 | Ohtsuka et al. | 219/10.55 M |
| 4,417,116 | 11/1983 | Black | 219/10.55 A |
| 4,549,053 | 10/1985 | Haugh | 219/10.55 A |
| 4,694,133 | 9/1987 | Le Viet | 219/10.55 M |

FOREIGN PATENT DOCUMENTS

484937  8/1917  France ............... 138/38

Primary Examiner—Philip H. Leung
Attorney, Agent, or Firm—Vogt & O'Donnell

[57] ABSTRACT

A process and an apparatus for the homogeneous heat treatment of a liquid which induces a helical swirling motion to the liquid to obtain a substantially homogeneous final thermal state and constant final temperature of the liquid. The liquid is moved through a vertical cylindrical tube which contains a central column and at least one perforated plate and is exposed to a microwave energy field as it moves through the tube.

19 Claims, 2 Drawing Sheets

PROCESS AND DEVICE FOR HOMOGENEOUS MICROWAVE THERMAL TREATMENT OF LIQUID OR SOLUTION IN MOTION

This is a continuation of application Ser. No. 06/846,291, filed Mar. 31, 1986 U.S. Pat. No. 4,694,133.

This invention relates to a process for the homogeneous heat treatment of a liquid or solution in motion. The invention also relates to an apparatus for carrying out this process.

It is known that liquids may be homogeneously heat-treated, for example, in a reactor fitted with vanes or blades of which the function is to mix and advance the product to be treated. This type of apparatus has a number of disadvantages which make it difficult to use. This is because the presence of vanes or blades for the mechanical scraping of the product makes it necessary to resort to an often complex construction which may be subject to technical failures, in addition to which the problem of wear of the mechanical components thus used can result in prohibitive material and labor costs. On the other hand, an apparatus of the type in question is not always satisfactory in its actual technical function, above all with more viscous products. The reason for this is that the scraping does not take place against the wall of the reactor so that part of the product remains on the wall, forms a crust and burns, which interferes with the homogeneous heat treatment process and may lead to blockages and enforced stoppage and cleaning of the reactor as a whole.

The process according to the invention enables these disadvantage to be overcome by eliminating the major part of the mechanical components and by guaranteeing the absence of adhesion to the walls of the reactor while, at the same time, ensuring perfect operational reliability and thorough mixing of the product to be treated.

The present invention relates to a process for the homogeneous heat treatment of a liquid or solution in motion in a vertical cylindrical tube, in which a helical swirling motion is induced in said liquid or solution by application of microwave energy so as to obtain a substantially constant final temperature.

The principle of the process according to the invention is based on the fact that the flow of liquid to be treated is subjected in the vertical cylindrical tube to the resultant of two forces, namely, on the one hand, the force of the flow velocity of the liquid and, on the other hand, the force representing the power of penetration of the microwave energy. The first force mentioned is constant irrespective of position in the vertical cylindrical tube. By contrast, the second force is variable according to the temperature of the medium in question, namely the higher the temperature of the medium, the more the penetrative power increases. This means that, on entering the vertical tube, the liquid is subjected to a very weak microwave penetration force which then increases as the liquid moves through the microwave energy field, i.e., as the temperature increases. The liquid flux is thus subjected to the resultant of the two abovementioned forces so that this liquid does not rise vertically, but instead follows a flattened swirling movement due to the increase in the microwave penetration force vector as the liquid approaches the exit of the vertical cylindrical tube. This helical swirling motion consequently produces a mixing of the liquid or solution to be treated by nonmechanical means so that a liquid of which the temperature is substantially constant is obtained at the exit of the cylindrical tube.

The process according to the invention can have several practical applications: either the desired objective is to sterilize a liquid or solution, making sure that the entire medium is at the desired temperature so that perfect sterilization is obtained, or it is desired to bring a liquid medium to a given temperature to impart to it specific organoleptic characteristics or to subject it to an aftertreatment at the final homogeneous temperature envisaged.

According to the invention, it is possible to treat any type of liquid or solution providing it has a viscosity at 50° C. of less than $3 \times 10^4$ centipoises. For example, water, sugar-containing solutions, molasses, pure cocoa paste, cream, milk, etc., may be treated in accordance with the invention.

In the practical application of the process according to the invention, there are two crucial parameters which have to be adjusted for a given liquid or solution, namely throughflow and microwave power, because it is these two parameters which determine the resultant force to which the liquid will be subjected. In the case of an upwardly flowing liquid or solution, throughflow and microwave power will be selected so that said liquid or said solution is subjected to the microwave energy for a sufficiently long time to obtain a product of which the final thermal state is homogeneous and of which the final temperature is constant. These two variables are of course a function of the initial temperature of the liquid and of the final temperature which it is desired to impart to said liquid, namely the greater this temperature difference, the slower the throughflow rate and the greater the microwave energy absorbed.

The invention also relates to an apparatus for the homogeneous heat treatment of a liquid or solution in motion which comprises a vertical, cylindrical circulation tube for the liquid situated in a microwave applicator and comprising a central column and at least one perforated plate arranged perpendicularly to the axis of said central column and at least one microwave energy source.

The function of the central column and the perforated plate is to ensure that the velocity of the liquid flux is evenly distributed over the entire height and the entire diameter of the vertical cylindrical tube. In the case of an empty cylindrical tube, the flow velocity of the liquid is maximal at the center and approaches zero at the sides of said cylinder which in no case can gurantee thermal homogeneity. The vertical cylindrical tube together with the central column and the perforated plate are made of a material that does not absorb microwave energy, for example, glass, ceramic, teflon, porcelain or glass-fiber-reinforced teflon. The vertical cylindrical tube is preferably made of glass.

The microwave source is arranged laterally on the outside of the applicator. The number of microwave sources and their power are not critical, being determined according to the desired increase in temperature. In one preferred embodiment, there are two microwave energy sources spaced apart along the vertical tube and arranged substantially diametrically opposite one another in relation to the axis of said vertical cylindrical tube. It is also possible to arrange the two microwave sources in a common plane perpendicular to the axis of the cylindrical tube. In this case, the only condition is that the two sources are not face-to-face, but side-by-side.

The apparatus according to the invention preferably comprises two perforated plates. In this case, the function of the second plate is to restrict the thermal current so as to avoid bubbling which would cause temperature disparities.

The plate comprises perforations of greatest diameter at its periphery, of intermediate diameter at its center and of smallest diameter between the two aforementioned types of perforations. The ratio of the cross-sections of the holes to the total cross-section of the plate is of the order of ⅛.

The thickness of the vertical cylindrical tube does not exceed 10% of the internal diameter of said tube.

The central column arranged in this vertical tube preferably does not extend over the entire height of said tube, but only as far as the second perforated plate which is situated substantially at two-thirds of the height of the tube. The distance between the two perforated plates is of the order of one-third of the height of the vertical tube.

The apparatus according to the invention enables a liquid to be brought simply, neatly, efficiently, rapidly and reproducibly from an initial temperature to a final homogeneous temperature without mechanical mixing and without the formation of crust on the walls.

The invention is described in more detail with reference to the accompanying drawings.

DESCRIPTION OF THE DRAWINGS

Figure 2:
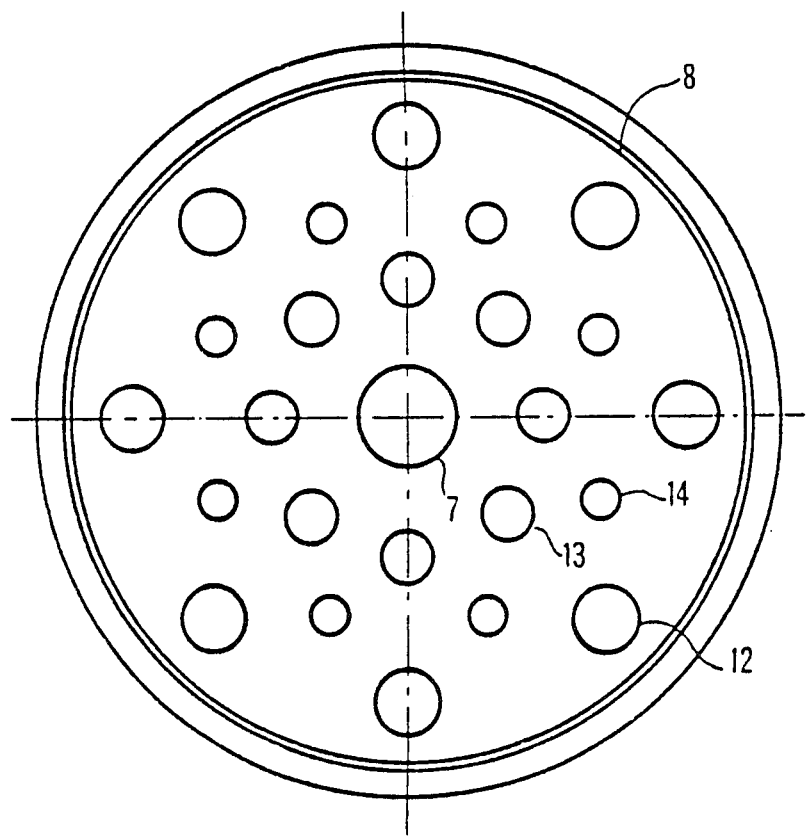
FIG. 2 is a section of the line 2—2 of FIG. 1.

The apparatus according to the invention comprises a vertical cylindrical tube (1), preferably of glass, with an inlet pipe (2) and an outlet pipe (3) connected to said tube by steel covers (10) and couplings (4). This tube is situated in a microwave applicator (5). The whole is arranged on a support (6). The upper part of the tube (1) and the upper cover (10) are isolated in a housing (21). The cylindrical tube (1) comprises a central column (7) and two perforated plates (8). The thermometer (11) enables the exit temperature of the liquid to be monitored. Finally, two microwave energy sources (9) are arranged on the sides of the vertical tube (1). FIG. 2 shows the distribution of the perforations in the plate (8) situated in the tube (1). The plate comprises the largest perforations (12) at its periphery, the perforations of intermediate diameter (13) next to the central column (7) and the smallest perforations (14) between the perforations (12) and (13). The number of these perforations is variable, preferably of the order of five to fifteen perforations per type.

The mode of operation of this apparatus is as follows:

A liquid (17) is held in a tank (16) mounted on a support (19). The valve (18) is opened and the pump (15) is switched on to bring the liquid into the cylindrical tube (1). When the level of the liquid reaches two-thirds of the height of the tube, the two microwave sources (9) are switched on. The liquid ascends in the tube (1), is exposed to the microwave energy field and flows through the pipe (3) into the receiving basin (20). Naturally, the liquid only reaches the desired temperature after a certain time interval, for example, of the order of ten minutes where water is being heated from 50° to 100° C. The liquid is thus obtained at the desired temperature either for sterilization purposes or to subject the liquid to an aftertreatment or to provide it with specific organoleptic properties.

Figure 1:
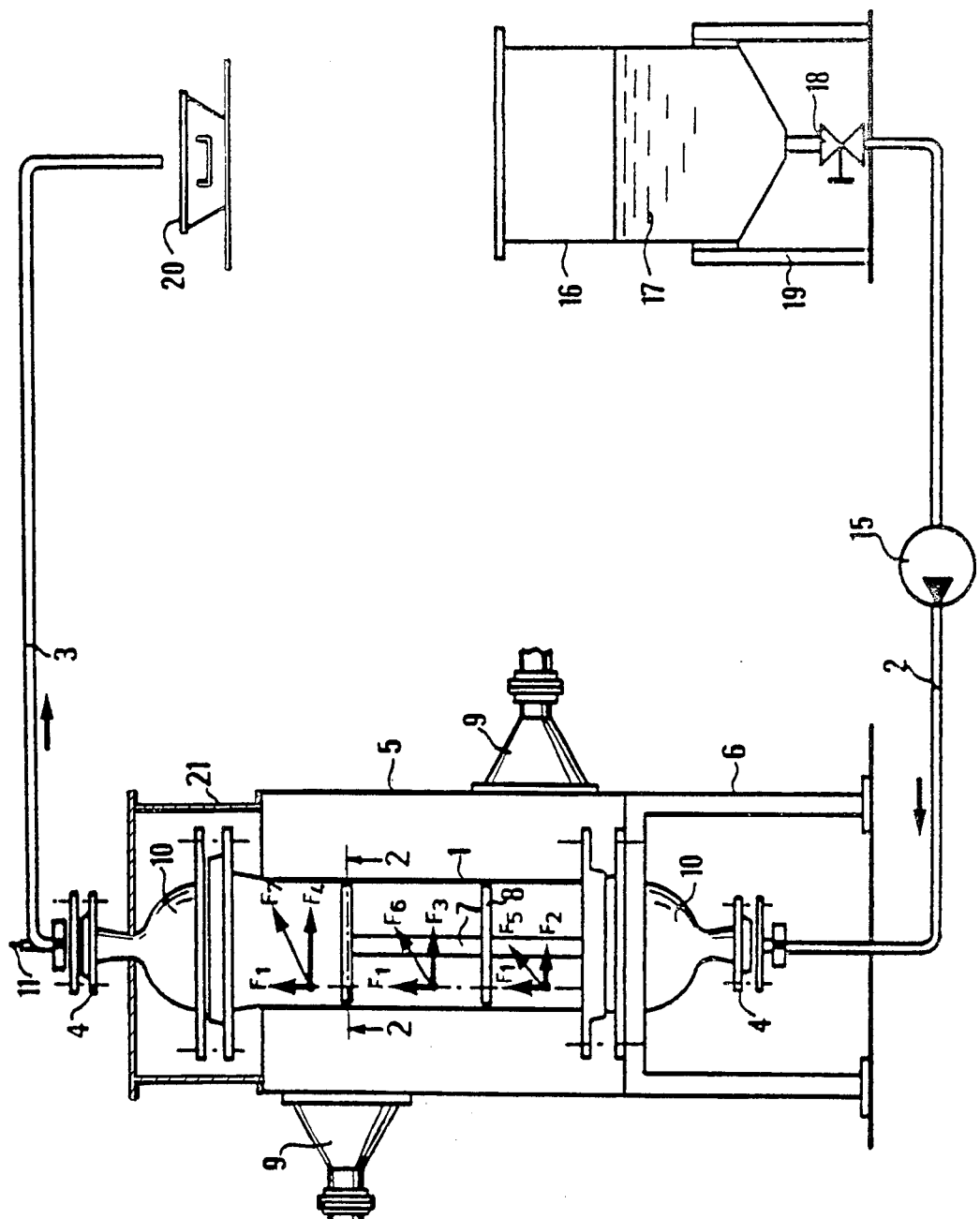
FIG. 1 diagrammatically illustrates the apparatus according to the invention.

Finally, FIG. 1 shows the forces to which the stream of liquid to be treated is subjected. As already mentioned, the power of penetration of the microwave energy increases with the temperature of the liquid. The force associated therewith thus increases from $F_2$, $F_3$ to $F_4$ with increasing height in the tube (1). Since the force $F_1$ associated with the movement of the liquid remains constant over the entire height of the tube, force resultants $F_5$, $F_6$ and $F_7$ are obtained of which the intensity increases and of which the angle relative to the horizontal decreases. These different resultants explain clearly the helical movement induced and also show that the swirling movement increases with increasing temperature of the fluid. The invention is further illustrated by the following Example.

EXAMPLE

The apparatus used is that shown in FIG. 1 with two microwave sources of 5 kW each, a cylindrical tube 1 meter tall and 18 cm in diameter and comprising two plates and a central column 3 cm in diameter and 60 cm tall. The perforations have respective diameters of 15, 8 and 12 mm and are 8 in number for each type of perforation.

The fluid to be treated is molasses which is moved at a rate of 70 kg/hour under a pressure of 2 bars and which it is desired to bring from the initial temperature of 70° C. to a final temperature of 150° C. With known types of apparatus, the temperature of the molasses cannot be raised above 80° C. This is because the molasses foams at that temperature and any further increase in temperature is impossible.

It is advantageous to caramelize the molasses at a temperature of 150° C. to provide it with specific organoleptic properties. This treated molasses is then used for mixing with coffee powder.

I claim:

1. A process for heating a liquid comprising moving the liquid through a vertical cylindrical tube while restricting the flow of the liquid through the tube via contact with surfaces within the tube and while exposing the liquid to a microwave energy field for inducing a helical swirling movement to the liquid as the liquid moves through the tube.

2. A process as claimed in claim 1, wherein the liquid has a viscosity below $3 \times 10^4$ centipoises.

3. A process as claimed in claim 1, wherein the throughput flow of the liquid and the energy of the microwave field are such that the liquid is exposed to the microwave field for a time sufficient such that the liquid has a homogeneous thermal state and a constant temperature upon flowing through the tube.

4. A process as claimed in claim 1, wherein the liquid moves upwards through the tube.

5. A process as claimed in claim 4 wherein the liquid has a viscosity at 50° C. of less than $3 \times 10^4$ centipoises.

6. A process as claimed in claim 1, wherein the liquid is pure cocoa paste.

7. A process as claimed in claim 1 wherein the liquid is selected from the group consisting of cream and milk.

8. A process as claimed in claim 1, wherein the liquid is molasses.

9. An apparatus for heating liquids comprising:
  a vertically positioned cylindrical tube, having an inlet and an outlet at its ends for receiving and discharging a liquid;

at least one microwave energy source positioned outside of the tube;

a stationary column within a central portion of the tube extending from the inlet end of the tube for at least a portion of a height of the tube; and at least one perforated plate arranged within the tube perpendicularly to the axis of the column and the tube, which is, together with the column, for distributing the liquid within the tube and which is, together with the column and a microwave energy field generated by the microwave energy source, for producing a helical swirling movement of the liquid through the tube.

10. An apparatus as claimed in claim 9, wherein there is one perforated plate at a position at about one-third of the height of the tube away from the inlet end and the column extends from the inlet end to at least above the position of the plate.

11. An apparatus as claimed in claim 9, wherein there is one perforated plate at a position in a spaced relation away from the inlet end of the tube and there is a second perforated plate at a position in a spaced relation away from the first plate and in a spaced relationship away from the outlet end of the tube.

12. An apparatus as claimed in claim 11, wherein the column extends from the inlet end of the tube to at least a height in the tube at the position of the second plate.

13. An apparatus as claimed in claim 12, wherein the first plate is at a position at about one-third of the height of the tube away from the inlet end of the tube and the second plate is at a position at about one-third of the height of the tube away from the outlet end of the tube.

14. An apparatus as claimed in claim 9, wherein the perforations of each plate have a cross section with respect to the cross section of each plate in a ratio of about 1:8.

15. An apparatus as claimed in claim 9, wherein each perforated plate has perforations of differing size such that the perforations are largest at a periphery portion of the plate, are of intermediate size at a central portion of the plate and are smallest between the periphery and center porations.

16. An apparatus as claimed in claim 9, wherein there are two microwave energy sources.

17. An apparatus as claimed in claim 16, wherein the two microwave energy sources are arranged laterally at a distance apart and substantially diametrically opposite in relation to an axis of the tube.

18. An apparatus as claimed in claim 9, further comprising a supply tank associated with the inlet end of the tube and a liquid receiving device associated with the outlet end of the tube.

19. An apparatus as claimed in claim 9, wherein the inlet end of the tube is at the tube bottom and wherein the outlet end of the tube is the tube top further comprising means to move the liquid to the inlet end and through the tube.

* * * * *

UNITED STATES PATENT AND TRADEMARK OFFICE
CERTIFICATE OF CORRECTION

PATENT NO. : 4,778,969

DATED : October 18, 1988

INVENTOR(S) : Toai Le Viet

It is certified that error appears in the above-identified patent and that said Letters Patent is hereby corrected as shown below:

Column 1, line 7, after "1986" insert --, now--.

Column 1, line 33, "disadvantage" should be --disadvantages--.

Column 1, line 55, insert a comma after "namely".

Column 1, line 62, "abovementioned" should be --above-mentioned--.

Column 1, line 68, "nonmechanical" should be --non-mechanical--.

Column 2, line 10, "aftertreatment" should be --after-treatment--.

Column 2, line 32, after "namely" insert a comma.

Column 3, line 4, "would" should be --could--.

UNITED STATES PATENT AND TRADEMARK OFFICE
CERTIFICATE OF CORRECTION

PATENT NO. : 4,778,969

DATED : October 18, 1988

INVENTOR(S) : Toai Le Viet

It is certified that error appears in the above-identified patent and that said Letters Patent is hereby corrected as shown below:

Column 4, line 1, "aftertreatment" should be --after-treatment.

Column 4, line 57, i.e., line 1 of claim 5, after "4" insert a comma.

Column 4, line 61, i.e., line 1 of claim 7, after "1" insert a comma .

Column 6, line 13, i.e., line 6 of claim 15, "porations" should be --portions--.

Signed and Sealed this

Eighteenth Day of April, 1989

*Attest:*

DONALD J. QUIGG

*Attesting Officer*       *Commissioner of Patents and Trademarks*